Figure 1:
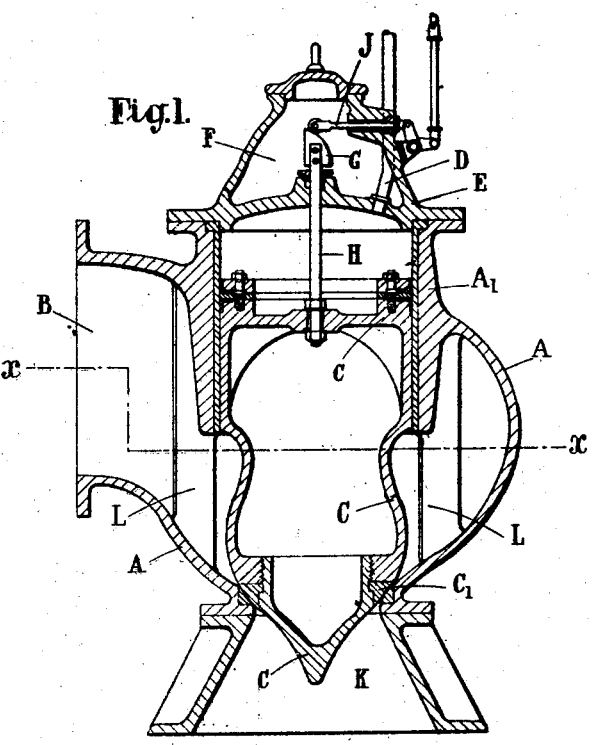

July 28, 1925.  1,547,962

P. W. SEEWER

VALVE FOR HYDRAULIC PURPOSES

Filed March 17, 1922

Inventor
Paul W. Seewer
by Wilkinson & Giusta
Attorneys.

Patented July 28, 1925.

1,547,962

UNITED STATES PATENT OFFICE.

PAUL WERNER SEEWER, OF NEW MALDEN, ENGLAND, ASSIGNOR TO THE ENGLISH ELECTRIC COMPANY, LIMITED, OF LONDON, ENGLAND, A BRITISH COMPANY.

VALVE FOR HYDRAULIC PURPOSES.

Application filed March 17, 1922. Serial No. 544,476.

*To all whom it may concern:*

Be it known that I, PAUL WERNER SEEWER, a citizen of the Swiss Confederation, residing in New Malden, Surrey, England, have invented certain new and useful Improvements in Valves for Hydraulic Purposes, of which the following is a specification.

This invention relates to valves which control the discharge of liquid under pressure into a more or less enclosed space and is applicable to cases where the pressure head and the volume discharge are of considerable magnitude so that if the discharge takes place in a concentrated jet it has the capacity for destructive action on the enclosing structure or other object in its path. It will be seen that in such cases it is a question of dealing with energy at a high rate in such a manner as to neutralize or minimize its destructive action. An example of the conditions to which the invention applies is provided by the relief valve of a hydraulic turbine which is arranged so as to open to permit temporary discharge of the water into the tail race when the governor acts to cut off or reduce the supply to the turbine wheel.

In accordance with the present invention the valve is so formed or arranged that prior to passing through it or in the course of passing through it the liquid receives a component circumferential motion about the axis of discharge so that as the jet emerges from the valve it is spread out by centrifugal action so as to produce a hollow cone instead of a solid cylinder of water. This arrangement provides that the discharge takes place with a minimum of frictional loss so that the discharge is free while the issuing water is in such a form that the energy can readily be absorbed without violent destructive action.

The tendency to rotate can be produced either by the use of guiding members or by the form of the valve chamber or the form and disposition of the passage through which the liquid is led into the chamber. In the first case a ring of guide plates may be arranged round the valve member which is in the form of a tapering circular body adapted to move axially inward away from its seating in order to open the valve. These guide plates are disposed so as to make an angle with radial lines so as to deflect the liquid from radial flow imparting to it a tangential component. In the case where the form of the chamber produces the tangential component, this form may be a spiral about the axis of discharge, the liquid being led in a plane approximately at right angles to the axis around which it flows out. A similar effect may be produced by making the chamber cylindrical and arranging the leading-in passage approximately tangential to the cylinder.

Figure 2:
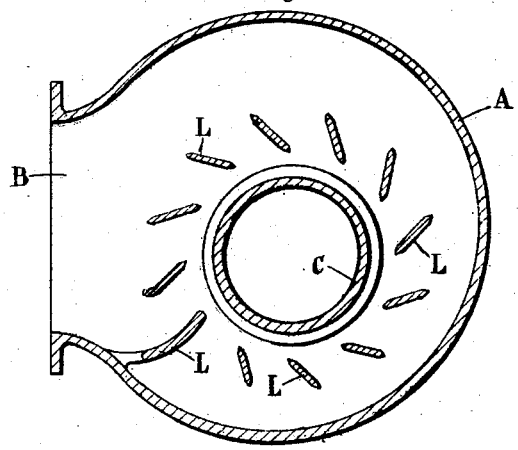

The accompanying drawings, Figures 1 and 2, show in sectional elevation and plan on the line XX of Figure 1 respectively, by way of example a hydraulically operated relief valve having guiding means for producing rotation of the liquid according to this invention. In these figures, A is the valve chamber which is in communication at inlet B with the supply liquid before it passes through the speed governing device. This governing device, which is actuated by a centrifugal or other type of governor driven by the turbine, cuts off or reduces the supply to the turbine wheel, as required. The valve C slides up and down in the cylinder $A^1$, which forms part of the chamber A, and the upper portion of the valve forms a piston which is acted upon by liquid under pressure delivered and exhausted through the control pipe D into the upper part of cylinder $A^1$ which is enclosed at the top by the casting E. In the top portion of this casting is a chamber F containing a cam segment G connected to a spindle H which is bolted at its lower end to the valve C. The segment G thus moves up and down with the valve and actuates the horizontal spindle J, to the end of which a small roller is attached, from left to right as the valve moves upwards. The horizontal spindle is connected by link work to an indicator (not shown) which shows the position of the valve C and also acts in conjunction with the governor mechanism and a hydraulic valve, which governs the connection of the pipe D to the pressure supply or to the exhaust, to regulate the distance which the valve C temporarily opens at $C^1$ to permit discharge of liquid through K into the tail race in dependence upon the degree to which the governor has reduced the liquid supply to the turbine wheel. It will be seen from the drawing that the outlet aperture from the chamber A when the valve is fully opened is of the same order of magnitude as the inlet aperture. The valve C tends automatically to open under the action of the pressure in the chamber A because its area at the lower end of cylinder $A^1$ is greater than its area at the seating $C^1$. This tendency to open is restrained by the pressure of liquid in the upper part of $A^1$. Inside the valve chamber A and integral therewith and supporting the valve slideway $A^1$ is a ring of guide vanes L arranged around the valve C in such a manner that the liquid in flowing from the outer part of the casing towards the valve is prevented from flowing in a purely radial direction with reference to the centre line of the valve and is forced to flow in a more or less tangential direction so that it issues through the seating $C^1$ into the part K having a component circumferential motion about the axis of discharge. The production of the desired circumferential motion is assisted by the fact that the inlet B is situated to one side of the axis of discharge so that the liquid receives a tangential component with respect to this axis and also by the spiral form of the casing around the axis of discharge which tends to promote the uniform velocity of the flow around this axis.

It will be understood that methods other than hydraulic methods may be employed for operating the relief valve and also that the form of construction of the valve described with reference to the drawings has only been given by way of illustration of the general method of the invention in accordance with which a tangential component of velocity is imparted to the liquid so that it is spread apart by centrifugal force as it emerges.

We claim as our invention:—

1. A valve for discharging rapidly and harmlessly large quantities of liquid under pressure comprising a chamber having inlet and outlet apertures of the same order of magnitude, a movable member, means for causing the said member to move backwards and forwards through a defined stroke as required and to close the outlet when in one of its positions and guiding means acting on the liquid when discharge is taking place and imparting thereto a component circumferential motion resulting in rotation of the liquid about the axis of discharge so that as it leaves the valve the body of liquid is spread out by centrifugal action to form a hollow cone.

2. A valve for discharging rapidly and harmlessly large quantities of liquid under pressure comprising a chamber having inlet and outlet apertures of the same order of magnitude, a movable member, means for causing the said member to move backwards and forwards through a defined stroke as required and to close the outlet aperture when in one of its positions, a ring of guide plates within the chamber and disposed around the outlet aperture so as to act on the liquid flowing thereto and impart to it a component circumferential motion about the axis of discharge so that the emerging liquid is spread out by centrifugal force to form a hollow cone.

3. A valve for discharging rapidly and harmlessly large quantities of liquid under pressure comprising a chamber having inlet and outlet apertures of the same order of magnitude disposed in planes approximately at right angles to each other, and a movable member, means for causing the said member to move backwards and forwards through a defined stroke as required and to close said outlet when in one of its positions, the chamber having a spiral form about the axis of discharge whereby a component circumferential motion about the said axis is imparted to the liquid so that the emerging liquid is spread out by centrifugal action to form a hollow cone.

4. A valve for discharging rapidly and harmlessly large quantities of liquid under pressure comprising a chamber having inlet and outlet apertures of the same order of magnitude disposed in planes approximately at right angles to each other, a movable member adapted to close said outlet when in one of its positions, a ring of guide plates in the chamber and around the axis of discharge, said plates being disposed at an angle to radial planes containing the said axis and the chamber having a spiral form about the said axis whereby a component circumferential motion about this axis is imparted to the liquid and it is spread out by centrifugal force to form a hollow cone on emerging from the chamber.

5. A valve for discharging rapidly and harmlessly large quantities of liquid under pressure comprising a chamber, a member slidable in said chamber, a slideway in said chamber for said member, a ring of guide blades within the chamber disposed around the outlet aperture so as to act on the liquid flowing thereto and impart to it a component circumferential motion about the axis of discharging so that the emerging liquid is spread out by centrifugal force to form a hollow cone, the said guide blades forming supports for the said slideway.

In testimony whereof I have signed my name to this specification in the presence of two subscribing witnesses.

PAUL WERNER SEEWER.

Witnesses:
 JOHN RICHARD JAMES,
 ARTHUR F. R. CURTEIS.